(12) United States Patent
O'Brien et al.

(10) Patent No.: US 6,470,384 B1
(45) Date of Patent: Oct. 22, 2002

(54) MODULAR FRAMEWORK FOR CONFIGURING ACTION SETS FOR USE IN DYNAMICALLY PROCESSING NETWORK EVENTS IN A DISTRIBUTED COMPUTING ENVIRONMENT

(75) Inventors: Eric David O'Brien, Leesburg, VA (US); James Robert Tryon, Jr., Fremont, CA (US)

(73) Assignee: Networks Associates, Inc., Santa Clara, CA (US)

( * ) Notice: Subject to any disclaimer, the term of this patent is extended or adjusted under 35 U.S.C. 154(b) by 0 days.

(21) Appl. No.: 09/467,633

(22) Filed: Dec. 20, 1999

Related U.S. Application Data

(60) Provisional application No. 60/161,968, filed on Oct. 28, 1999.

(51) Int. Cl.[7] .............................................. G06F 15/173
(52) U.S. Cl. ...................... 709/223; 707/10; 345/735; 345/736
(58) Field of Search ................................. 709/223, 224; 707/10; 345/735, 100, 733, 736

(56) References Cited

U.S. PATENT DOCUMENTS 6,195,697 B1 * 2/2001 Bowman-Amuah ......... 370/252
6,226,679 B1 * 5/2001 Gupta ........................ 709/224
6,339,731 B1 * 1/2002 Morris et al. ............... 700/236
6,349,333 B1 * 2/2002 Panikatt et al. ............. 709/223
6,363,421 B2 * 3/2002 Barker et al. ............... 709/202

OTHER PUBLICATIONS

"Patrol 3.3—Advanced Enterprise Management and Control—Data Sheet," BMC Software, http://www.bmc.com/rs-bin/RightSite/getcontent/bmcdoc.html?dmw_objectid=090032018011c73e&dmw_format=html, 2000.
"HP OpenView Extensible SNMP Agent—Product Brief," Hewlett Packard, Jun. 1996.

* cited by examiner

Primary Examiner—Mehmet B. Geckil
(74) Attorney, Agent, or Firm—Patrick J. S. Inouye; Christopher J. Hamaty (57) ABSTRACT

A system and a method for configuring an action set for use in dynamically processing network events in a distributed computing environment are described. A graphical user interface associated with an action set is presented. An action set is stored into a database. At least one network event and at least one sensor are associated responsive to a user selection indicated on the graphical user interface. At least one action is embedded into the action set responsive to a user selection indicated on the graphical user interface. The association for the at least one network event and the embedding of the at least one action are stored into a mapping table.

26 Claims, 11 Drawing Sheets

MODULAR FRAMEWORK FOR CONFIGURING ACTION SETS FOR USE IN DYNAMICALLY PROCESSING NETWORK EVENTS IN A DISTRIBUTED COMPUTING ENVIRONMENT

CROSS-REFERENCE TO RELATED APPLICATION

This patent application claims priority under 35 U.S.C. §119(e) to provisional patent application Ser. No. 60/161,968, filed Oct. 28, 1999, the disclosure of which is incorporated herein by reference.

FIELD OF THE INVENTION

The present invention relates in general to network event management and, in particular, to a modular framework for configuring action sets for use in dynamically processing network events in a distributed computing environment.

BACKGROUND OF THE INVENTION

Information networks interconnecting a wide range of computational resources have become a mainstay of corporate enterprise computing environments. Typically, several host computer systems are interconnected internally over an intranetwork to which individual workstations and network resources are connected. These intranetworks, also known as local area networks (LANs), make legacy databases and information resources widely available for access and utilization throughout the corporation. These same corporate resources can also be interconnected to wide area networks (WANs), including public information internetworks such as the Internet, to enable internal users access to remote computational resources, such as the World Wide Web, and to allow outside users access to select corporate resources for the purpose of completing limited transactions or data transfer.

Structurally, these corporate networks generally are made up of a set of localized, often heterogeneous, subnetworks interconnected through a series of routers, hubs, bridges, gateways, and similar devices. Managing these subnetworks and the network as a whole has become increasingly complex and difficult as the size and topology of networks have grown. The Simple Network Management Protocol (SNMP), described generally in W. Stallings, "SNMP, SNMPv2, SNMPv3, and RMON 1 and 2," Chs. 1–4, Addison Wesley Longman (1999), the disclosure of which is incorporated herein by reference, defines a standardized framework of managers and agents for managing TCP/IP-based networks. Under the SNMP scheme, each manager is responsible for managing all or part of the network on behalf of network management applications and users. In turn, each agent, also known as sensor or listener, is responsible for collecting and maintaining local management information and delivering that information to one of the managers through messages in the form of SNMP traps or in response to a polling request by the manager.

A wide range of SNMP-compatible, manager/agent point products are presently available to meet various network management and security needs, such as applications for monitoring network performance and availability and proactively detecting network security vulnerabilities. One such application is the Sniffer Total Network Visibility (TNV) product, licensed by Network Associates, Inc., Santa Clara, Calif. By way of example, the Sniffer TNV product identifies network performance and security concerns through remote agents. A central manager analyzes the information collected by the remote agents and can generate a log file for use in identifying network fault and performance areas of interest. While useful for managing and troubleshooting enterprise computing environments, the Sniffer TNV manager is a dedicated application tied to a specific set of remote agents with whom the manager communicates via SNMP traps for indicating events unique to vendor specific network equipment.

Similarly, the OpenView product suite, licensed by Hewlett Packard Company, Palo Alto, Calif. provides a modular manager which responds to SNMP traps for use in legacy computing environments. The OpenView manager reports and can log the receipt of network events and includes an application programming interface (API) into which can be written plug-in actor applications. Likewise, the PATROL product, licensed by BMC Software, Houston, Tex., provides a management infrastructure for providing proactive monitoring and management of enterprise-wide computational resources through one or more SNMP managers. PATROL Knowledge Modules containing application-specific intelligence can be deployed to servers for reporting parameters and management options back to manager consoles.

The foregoing SNMP-based products represent specialized vertical products focused on resolving a particularized problem through vendor specific means. None provide a generic interface capable on interconnecting remote agents to actors via a centralized management framework. More specifically, there is no ability to flexibly and cooperatively integrate other manager/agent point products or response mechanisms into a single manager. For instance, each of the products can generate a log file specific to their respective interface, yet the log files are in non-uniform, proprietary formats which require analysis and management separate from other point products. Moreover, these products also lack a general purpose manager capable of integrating heterogeneous remote agents into a uniform framework for standardized processing of standard and proprietary SNMP events, such as node failures or active security concerns. Similarly, there is no general purpose manager for flexibly mapping actors capable of performing actions on behalf of network management applications and users in response to the receipt of disparate network events, such as automatic help desk ticket generation or electronic message notification.

Therefore, there is a need for an approach providing a modular framework within a centralized manager for flexibly configuring user-specified, executable actors or action sets to interface to network event generating agents or sensors. Such an approach would preferably include a capability to create configurations for processing standard and proprietary SNMP events, provide filtering functions between the receipt of such events and the processing of such action sets, and allow for variable output notifications and actions.

SUMMARY OF THE INVENTION

The present invention provides modular framework for configuring action sets for use in dynamically processing network events in a distributed computing environment.

An embodiment of the present invention is a system and method for configuring an action set for use in dynamically processing network events in a distributed computing environment. A graphical user interface associated with an action set is presented. An action set is stored into a database. At least one network event and at least one sensor are associated responsive to a user selection indicated on the graphical user interface. At least one action is embedded into the action set responsive to a user selection indicated on the graphical user interface. The association for the at least one network event and the embedding of the at least one action are stored into a mapping table.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
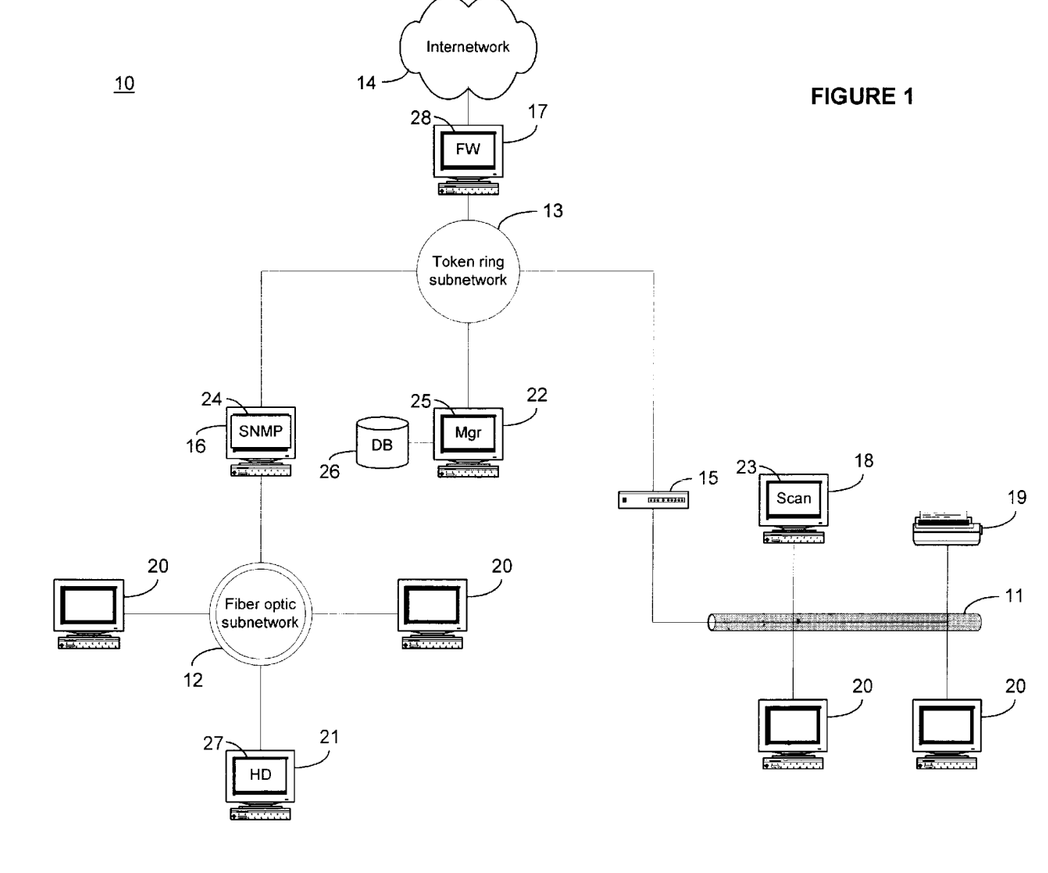
FIG. 1 is a functional block diagram showing a system for configuring action sets for use in dynamically processing network events in a distributed computing environment in accordance with the present invention.

FIG. 1 is a functional block diagram showing a system 10 for configuring action sets for use in dynamically processing network events in a distributed computing environment in accordance with the present invention. By way of example, a plurality of subnetworks, including an Ethernet subnetwork 11, a fiber optic subnetwork 12, and a token ring subnetwork 13, are interconnected using a bridge 15 and a router (operating on workstation 16). The token ring subnetwork 13 is interconnected to an internetwork 14, such as the Internet, using a gateway (operating on workstation 17). In addition to the foregoing network-related components, each subnetwork includes individual computational resources. For instance, the Ethernet subnetwork 11 includes a workstation 18 configured as an active security scanner (Scan) 23, a printer 19, and a pair of workstations 20. The fiber optic subnetwork includes a set of workstations 20, a workstation 21 configured as a help desk 27, and the workstation 16 further configured as a Simple Network Management Protocol (SNMP)-capable agent 24. Finally, the token ring subnetwork includes a workstation 22 configured as a network manager (Mgr) 25 with a dedicated database (DB) 26 on a secondary storage device and the workstation 17 further configured as a firewall (FW) 28. An example of a firewall 49 suitable for use in the present invention is the Gauntlet Firewall product, also licensed by Network Associates, Inc. Other network topologies and configurations of computational resources are feasible.

The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. In the described embodiment, the subnetworks 11, 12, 13 and internetwork 14 implement a Transmission Control Protocol/Internet Protocol (TCP/IP) network stack protocol implementation.

Figure 2:
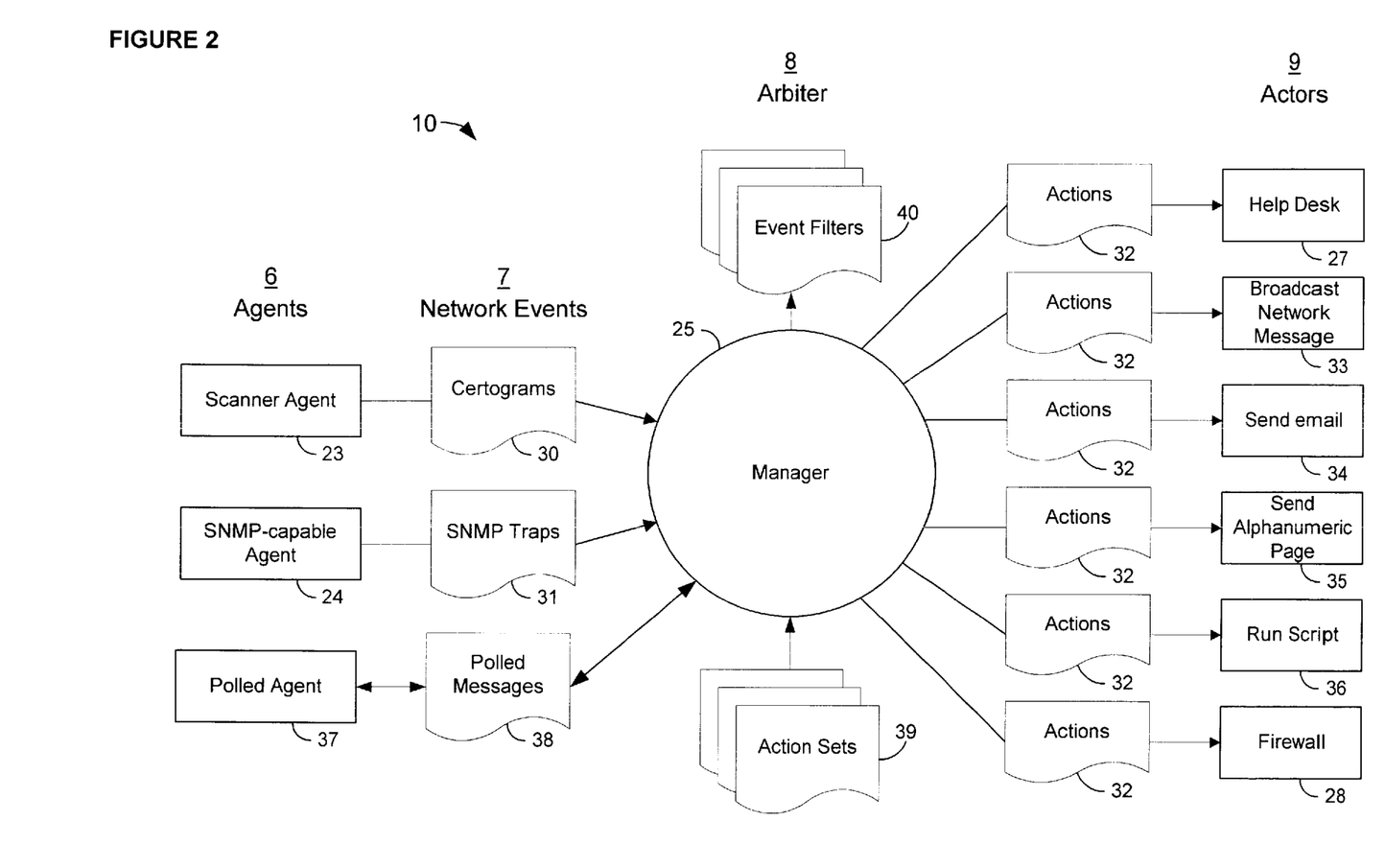
FIG. 2 is a process diagram showing of processing through the system of FIG. 1.

FIG. 2 is a process diagram showing the flow of processing through the system 10 of FIG. 1. Generally, there are three categories of components: agents 6, arbiter 8, and actors 9. The agents 6 generate network events 7 and the arbiter 8 maps the network events 7 to actions 32 which are performed by the actors 9. Network events 7 could be any type of state or condition which could be monitored and reported to the arbiter 8. Moreover, any of the agents 6 or actors 9 could be within the arbiter 8, on the same system 10 as the arbiter 8, or on another system remote from the arbiter 8.

In the described embodiment, the arbiter 8 is simply the manager 25. In addition, two types of agents, by way of example, are used, an active security scanner agent 23 and an SNMP-capable network management agent 24, although other types of agents could also be used. The scanner agent 23 sends security messages, known as "certograms" 30, notifying the arbiter 8 of the occurrence of network security and integrity concerns. The SNMP agent 24 sends SNMP traps 31 similarly notifying the arbiter 8 of the occurrence of network management concerns. The certograms 30 are sent with Transport Layer Security via TCP packets, as further described below. The SNMP traps 31 are sent in User Datagram Protocol (UDP) datagrams.

These two agents, scanner agent 23 and SNMP agent 24, actively report ("push") network events 7 to the manager 25. Alternatively, the manager 25 could poll the agents ("pull") for the occurrence of network events 7 via polling messages 34 exchanged with a polled agent 33. Other configurations of interconnections between various types of agents and the manager are possible, as is known in the art.

In response to the receipt of the network event notification, the manager 25 determines the set of actions to which the network event 7 is associated using a stored set of event mappings. Each of these action sets 39 group one or more actions 32 and one or more optional event filters 40. If appropriate, the manager 25 causes an actor 9 to perform some task by dispatching an appropriate action 32.

More specifically, the agents 6 sense the occurrence of network events 7. As an example, SNMP-capable agent 24 can generate two basic types of network events 7, generic and specific, which are properly referred to as "SNMP traps." Generic SNMP traps are commonly used and supported by all vendors. There are six generic traps: cold start, warm start, link down, link up, authorization failure, and neighbor loss. Specific SNMP traps are proprietary traps implemented by vendors to indicate the occurrence of events specific to their devices and must be defined in the Management Information Base (MIB) supplied with their hardware. An agent must have a copy of a vendor-specific MIB to interpret specific SNMP traps. In the described embodiment, two types of agents are used. The active security scanner agent 23 proactively analyzes the security and integrity of the network and reports any vulnerabilities to the manager 25 over an authenticated communications channel using specialized messages known as certograms 30. An example of a commercially available active security scanner agent 23 is included with the Cybercop Scanner product suite also licensed by Network Associates, Inc., Santa Clara, Calif. The SNMP-capable agent 24 monitors network performance and load characteristics. An example of a commercially available SNMP agent 24 is included with the Sniffer Total Network Visibility product suite also licensed by Network Associates, Inc. Both the SNMP agent 24 and active security scanner 18 can be implemented as either dedicated devices or as a part of the function provided by network resources.

The arbiter 8 manages the receipt, analysis, and processing of network events 7 based on user defined action sets 39. Each action set 39 defines mappings between actions 32 and event filters 40. Actions 32 are performed by actors 9 and are described below. Event filters 40 are actions which are performed after the receipt of a network event 7 but before any corresponding actions 32 are executed.

In the described embodiment, a network event 7 could be either a standard SNMP trap 31 or a specialized trap or notification, such as a certogram 30. In addition, three types of event filters are used, Visual Basic scripts, frequency thresholds, and adding custom values to the event or action based on SNMP values before the trap is forwarded to an action 32. Other forms of network events, actions and event filters are feasible as is known in the art.

The mapping of network events 7 to actions 32 is performed in an action set-centric fashion which ensures that any network event 7 may cause at least one corresponding action to occur. Each of the items associated with, in the case of a network event 7, or stored in, in the case of an event filter 40 or action 32, an action set 32 can have a many-to-many relationship to any other network event 7, event filter 40 or action 32 through participation in other action sets 39. An example of a commercially available manager 25 is the Event Orchestrator product suite also licensed by Network Associates, Inc.

The actors 9 take actions in response to instructions from the arbiter 8. In the described embodiment, six types of actors are supported, a help desk 27, firewall 28, and methods for broadcasting a network message 33, sending an electronic mail message (email) 34, sending an alphanumeric page 35, and running a script 36. Other types of actors and actions are feasible. The methods could be performed by the same system as the manager 25 or by another remote system depending upon the definition of the action. A system and method for dynamically processing action sets is disclosed in the related, commonly-assigned U.S. patent application Ser. No. 09/467,730, entitled "Modular Framework For Dynamically Processing Network Events Using Action Sets In A Distributed Computing Environment," pending, filed Dec. 20, 1999, the disclosure of which is incorporated herein by reference. Sensors, arbiter, and actors are further described in "Event Orchestrator for Windows NT—Getting Started Guide," Rel. 1.02, Network Associates, Inc. (Jan. 1999), the disclosure of which is incorporated herein by reference.

Figure 3:
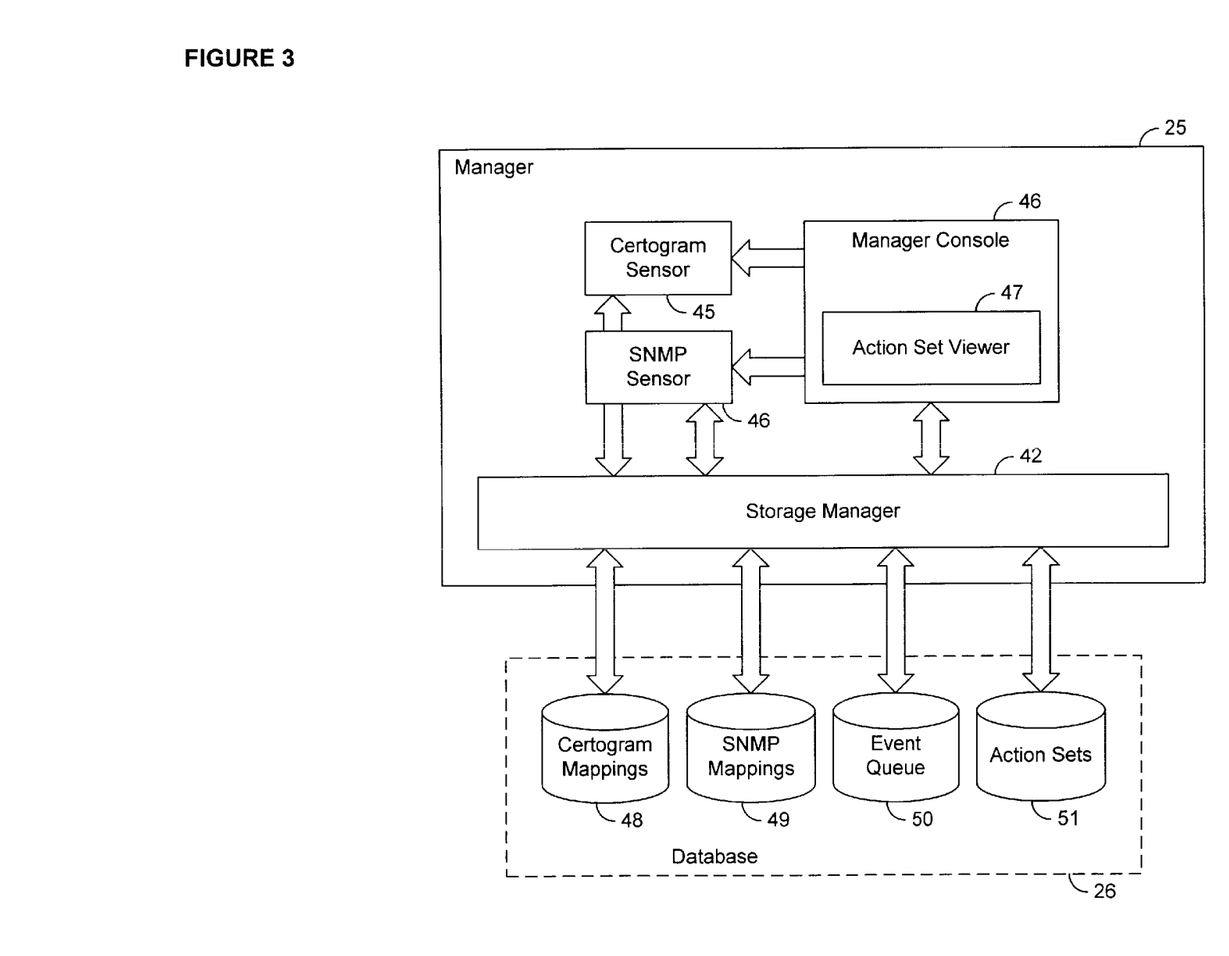
FIG. 3 is a block diagram showing the functional software modules of the manager of the system of FIG. 1.

FIG. 3 is a block diagram showing the functional software modules of the manager 25 of the system 10 of FIG. 1. Each module is a computer program written as source code in a conventional programming language, such as C++ and Visual Basic programming languages, and is presented for execution by the CPU as object or byte code, as is known in the art. The various implementations of the source code and object and byte codes can be held on a computer-readable storage medium or embodied on a transmission medium in a carrier wave. In the described embodiment, the software modules are written in accordance with the Common Object Model (COM), such as described in D. Chappell, "Understanding ActiveX and OLE," Chs. 1–5, Microsoft Press (1996), the disclosure of which is incorporated herein by reference.

The manager 25 comprises four main modules: certogram sensor 45, SNMP sensor 46, storage manager 47, and manager console 52. The mappings for network events 7, queued "events", that is, generated action sets, and action sets 39 are stored in the database 26. Each of these components will now be described more fully.

The certogram sensor 45 receives certograms 30 from active security agents, such as scanner agent 23, via an authenticated communications link as part of a secure Transport Layer Security connection. Active security monitors and protects the security and integrity of an unattended network through proactive analysis and by reporting to the manager 25 any suspicious or abnormal activities, such as break-in attempts or forged instructions to shut down a system. Thus, for security reasons, all communications between the system 10 and the scanner agent 23 are authenticated using digital certificates generated by a public key infrastructure (PKI) server (not shown). In the described embodiment, X.509 digital certificates are used. In particular, certograms 30 received from the scanner agent 23 can cause the manager 25 to generate action sets 25 defining the actions to ultimately be taken by the firewall 17 in response to a security alert from the scanner agent 23.

The SNMP sensor 46 receives SNMP traps from SNMP agents, such as SNMP-capable agent 24, via communications links which need not be authenticated. The SNMP standard defines an application-level protocol for remotely managing TCP/IP networks by representing individual network resources as objects. Individual SNMP messages are exchanged between agent and manager using User Datagram Protocol (UDP) datagrams. The agents can be controlled through the modification of the values of specific variables maintained in a Management Information Base (MIB) (not shown), as is known in the art. Upon the occurrence of certain network events 7, the SNMP agent 24 generates a trap which is sent via a UDP datagram to the manager 25.

The storage manager 47 is responsible for performing all accesses to the database 26 (shown in FIG. 1). All other processes, including the event manager 53 and the generate and process modules 54, 55, respectively, must coordinate database requests through the storage manager 47. Individual items stored in the database 26 are stored as storage objects which are analogous to tables in conventional databases. The database 26 consists of four principal storage objects, certogram mappings 48, SNMP mappings 49, event queue 50, and actions sets 51.

Certogram mappings 48 and SNMP mappings 49 are sets of event mappings which identify the action sets 39 associated with a particular sensor. One set of event mappings per sensor is required. Certogram mappings 48 and SNMP mappings 49 are event mappings which store the mappings of action sets 39 to network events 7, as identified by their respective sensor, certogram sensor 45 and SNMP sensor 46.

The event mappings are configured in an action setcentric manner, meaning an action set must be defined before any network event, event filter, or action can be defined. Each event mapping is referenced by a mapping key. For certograms 30, each event mapping is referenced by sensor and vulnerability. For SNMP traps 31, each event mapping is referenced by object identifier (OID), plus generic and specific identifiers. The OID identifies the particular source of the network event 7 by network address. The Generic identifier specifies whether the particular network event 7 is a known and expected event or whether the network event 7 is specific to the vendor of the agent from which the network event 7 originated. If so, the definition for the Specific identifier must be obtained from the MIB supplied with the network device. Other types of sensors may have unique mapping key formats.

The event queue 50 stores generated and processed action sets 56. Generated action sets 56 are enqueued in the event queue 50 in order of occurrence and severity. In the described embodiment, each action set is assigned a severity which indicates the general criticality of the network event 7. The action set is placed in the event queue 50 in a location higher than other action sets already in the queue but having a lesser severity. Thus, action sets 39 with the highest severity are processed before action sets 39 with lower severities, even if those lower severity action sets 39 have been enqueued for a longer period of time. The approach ensures that action sets 39 requiring the most attention, that is, having the highest severity, are processed as expeditiously as possible.

Each action set 32 is associated with a network event 7 via a mapping table, can store (embed) one or more actions 32, and can reference one or more event filters 40. Moreover, actions sets 45 can be "chained" to invoke subsequent action sets. However, to "link" an network event 7 to some action requires at least one action set 39 in the chain to be associated with at least one network event 7 and at least one action set 39 to embed at least one action 32.

The manager console 52 is primarily responsible for the configuration of action sets and includes an action set viewer 53 which presents a graphical user interface (GUI) through which a user can specify action set properties, as further described below with reference to FIGS. 6, 8, 10, and 12. The manager console 52 itself does not have a GUI; rather, each action set includes an Active X Control (OCX) which creates a view that appears to the user as a complete GUI window. The functions performed by the manager 25, including the manager console 52, are further described below in more detail beginning with reference to FIGS. 5A AND 5B.

Figure 4:
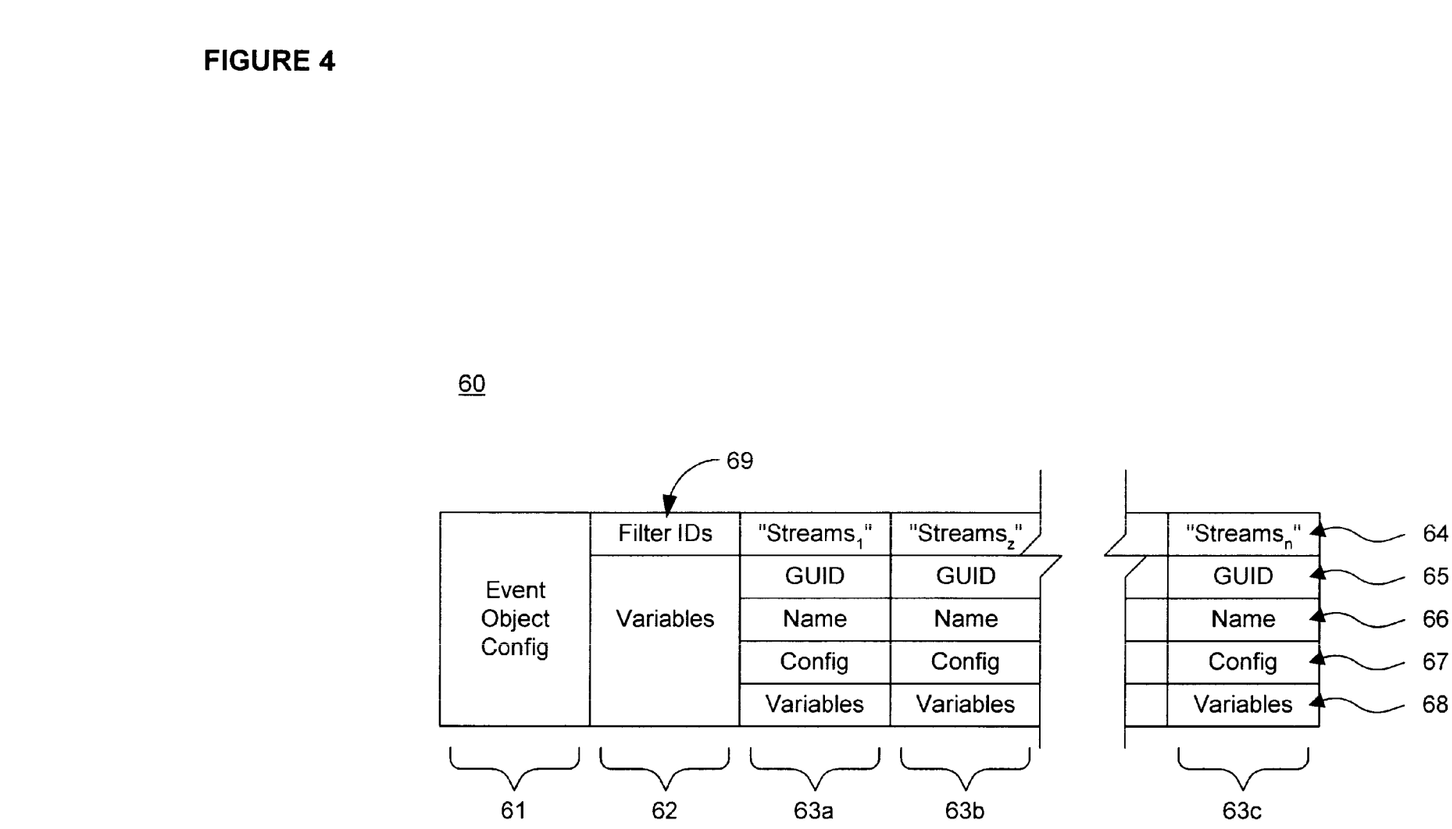
FIG. 4 is a data structure showing a binary large object (BLOB) for an action set for use in the manager of the system of FIG. 1.

FIG. 4 is a data structure showing a binary large object (BLOB) 60 storing an action set 32 for use in the manager 25 of the system of FIG. 1. Using the BLOB 60, an action set 32 can embed one or more actions 32 and can reference one or more event filters 40. An action set 32 forms an association with one or more network events 7 through scope, as the event mappings are stored in the database 26, including certogram mappings 48 and SNMP mappings 49, within an instance of an action set 32. Internally, each action set 32 stores the action set configuration 61, including any variables used by the action set 62, and one or more streams 63a–c within which are stored the specifications for actions 32. Each stream 63a contains a stream identifier 64, Globally Unique Identifier (GUID) 65, name 66, configuration 67, and any variables 68 used by the action. Also, if used, any filter identifiers 69 are also stored in the BLOB 60.

Figure 5A:
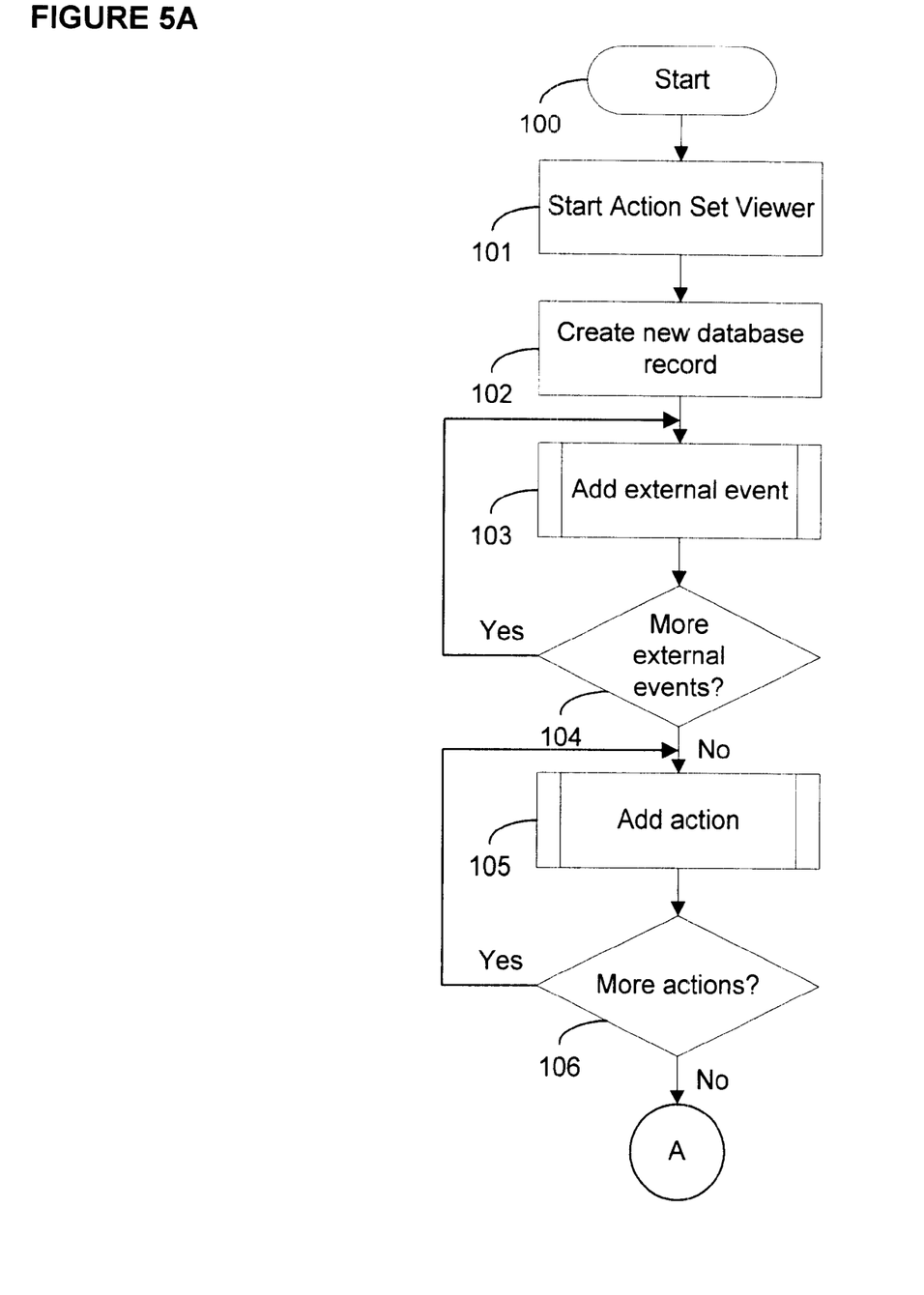
FIGS. 5A AND 5B are flow diagrams showing a method for configuring action sets for use in dynamically processing network events in a distributed computing environment in accordance with the present invention.
Figure 5B:
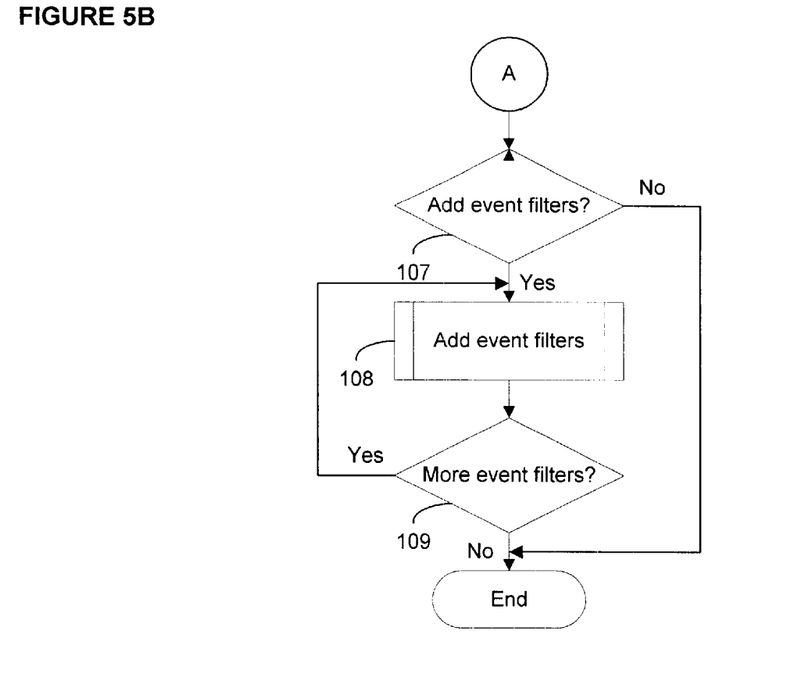

FIGS. 5A AND 5B are flow diagrams showing a method 100 for configuring action sets 60 for use in dynamically processing network events in a distributed computing environment in accordance with the present invention. The method consists primarily of an initialization phase (blocks 101–102) and configuration phase. First, during the initialization phase, the action set viewer 53 (shown in FIG. 3) is started (block 101). Each action set 60 is stored as a BLOB in the action sets 51 storage object within the database 26. A new database record containing a BLOB is created (block 102) once the action set static data (not shown) has been configured. During the configuration phase (blocks 103–109), external network events, actions, and event filters are added. Every action set 60 may include at least one action, plus one or more optional event filters. An external network event is added (block 103), as further described below with reference to FIGS. 7–9. Additional external events can be added as desired (block 104). Similarly, an action is added (block 105), as further described below with reference to FIGS. 10 and 11. Additional actions can be added as desired (block 106). Finally, if desired (block 107), an event filter can be added (block 108), as further described below with reference to FIGS. 11 and 12. Additional external events can be added as desired (block 109), whereupon the method ends.

Figure 6:
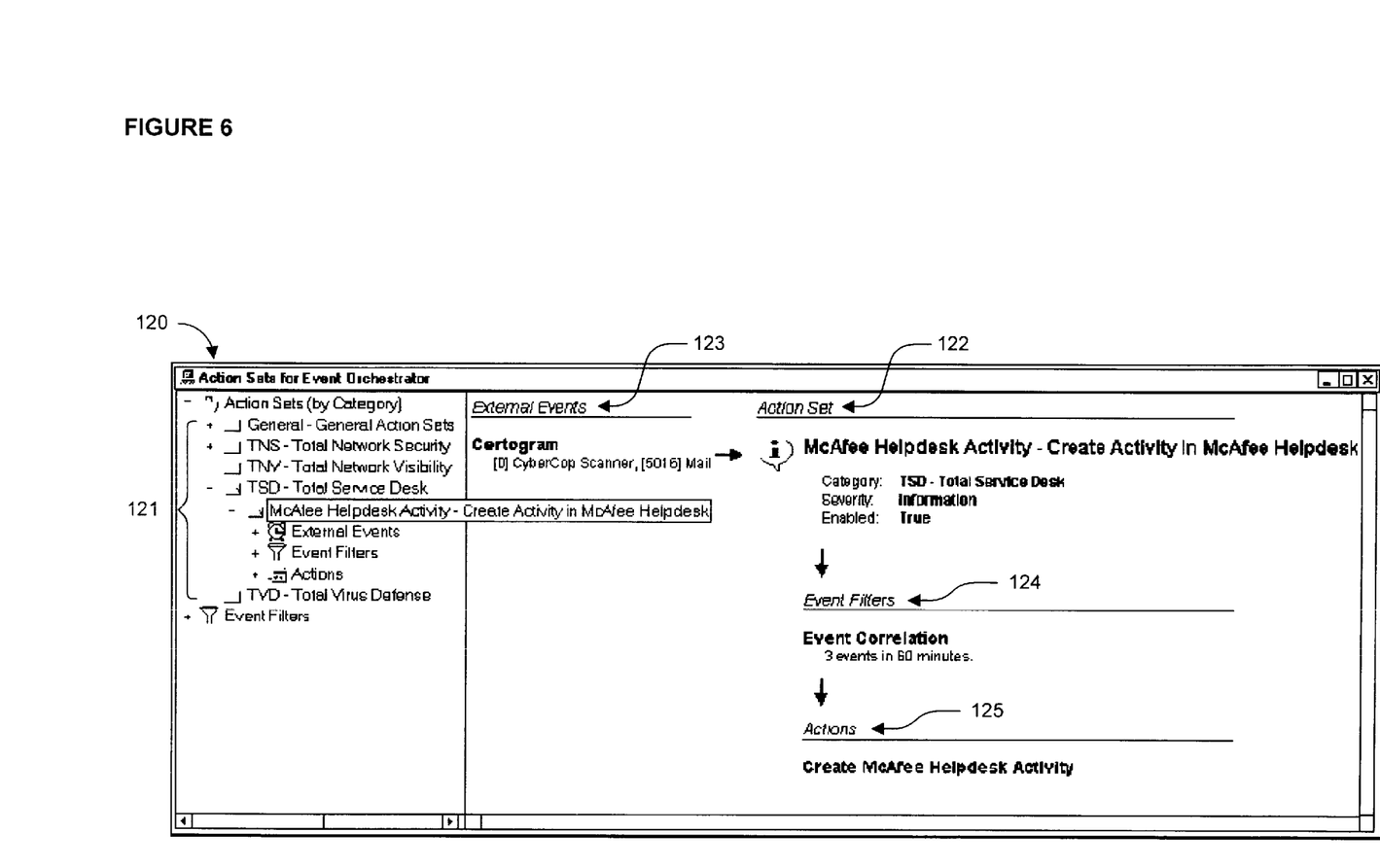
FIG. 6 is a screen shot showing, by way of example, the user controls for configuring an action set for use in the method of FIGS. 5A and 5B.

Note the order in which network events, actions, and event filters are added, as described above, is merely illustrative and other sequences of adding networks events, actions, and event filters are feasible. In the described embodiment, a graphical user interface (GUI) allows a user to configure the foregoing objects in any random order. By way of example, FIG. 6 is a screen shot 120 showing the user controls for configuring an action set 60 for use in the method 100 of FIGS. 5A and 5B. For convenience, individual action sets 60 can be grouped into categories 121 of action sets 60 serving a similar function. As shown, there are five categories 121 of action sets 60, general action sets, total network security, total network visibility, total service desk, and total virus defense. Other categories 121 are feasible. Each individual action set includes a description, category, severity, and enabled flag. As shown, the example action set 121 for "McAfee Helpdesk Activity" has a description of "Create Activity in McAfee Helpdesk," is in the "TSD—Total Service Desk" category, has a severity of "Information," with an enabled flag set to "True." In addition, as configured, the example action set 121 includes one external network event, "Certogram, [D] CyberCop Scanner, [5016] Mail," one event filter, "Event Correlation, 3 events in 60 minutes," and one action, "Create McAfee Helpdesk Activity." The specific types of available external network events, event filters, and actions are further described below.

Figure 7:
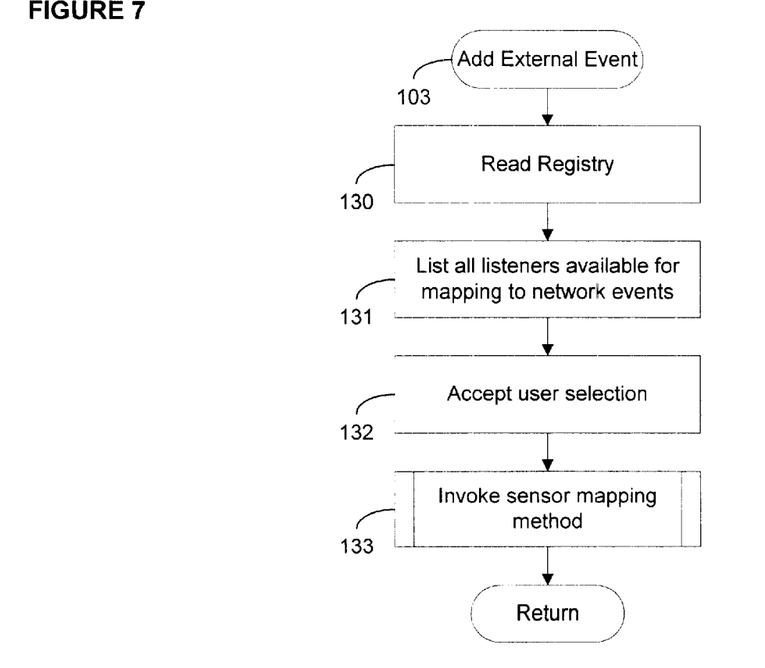
FIG. 7 is a block diagram showing the routine for adding an external event for use in the routine of FIGS. 5A and 5B.

FIG. 7 is a block diagram showing the routine for adding an external event 103 for use in the routine 100 of FIGS. 5A and 5B. The purpose of this routine is to record a mapping for a network event into the mapping table to associate the network event to the action set. The system registry is read (block 130) by the action set viewer 53 (shown in FIG. 3) and all sensors available for mapping to network events are listed (block 131). Upon the selection of a sensor by the user (block 132), an instance of the external event corresponding to the selected sensor is created (block 132). The sensor mapping method is invoked (block 133), as further described below in FIG. 8, whereupon the routine returns.

Figure 8:
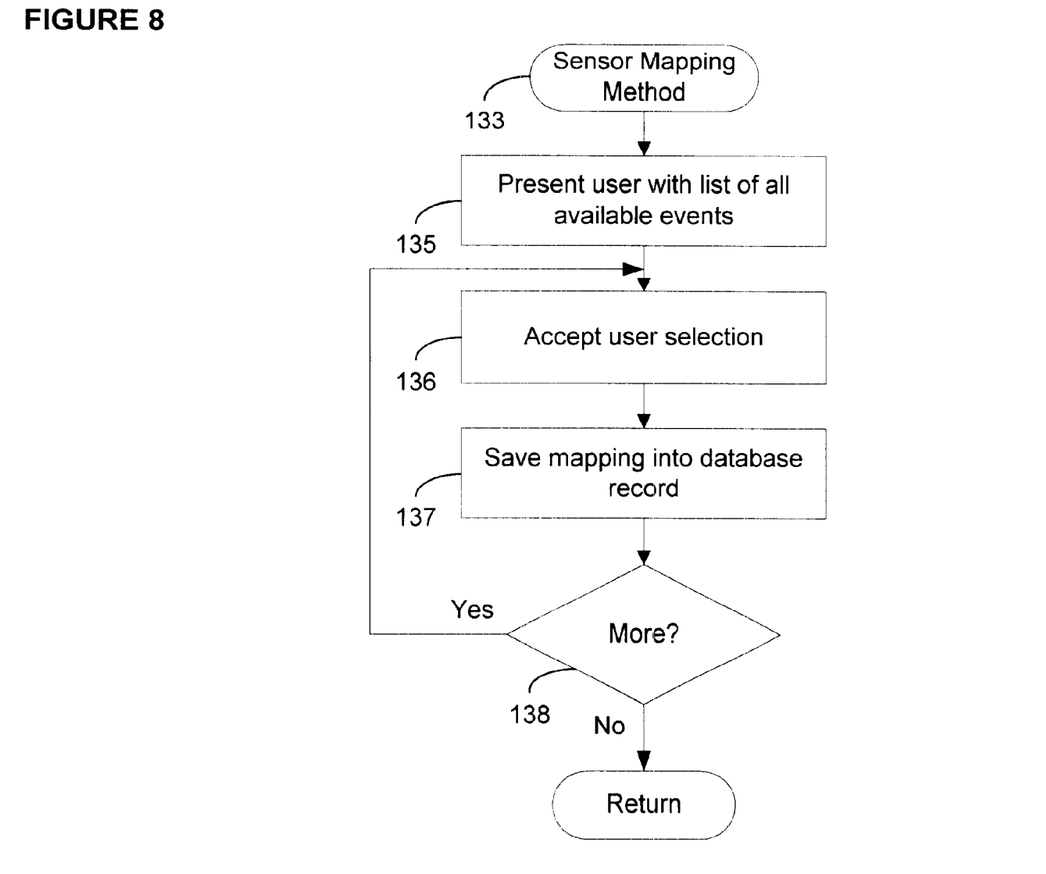
FIG. 8 is a block diagram showing the sensor mapping method for use in the routine of FIG. 7.

FIG. 8 is a block diagram showing the sensor mapping method 133 for use in the routine 103 of FIG. 7. The user is presented with a list of all network events 7 which are available for mapping (block 135). The user can then select as many of the listed network events 7 as desired. Each user selection is accepted (block 136) and saved as a mapping into the database record (block 137). The select-and-save steps (blocks 136–137) are repeated so long as more selections are made (block 138), after which the routine returns.

Figure 9:
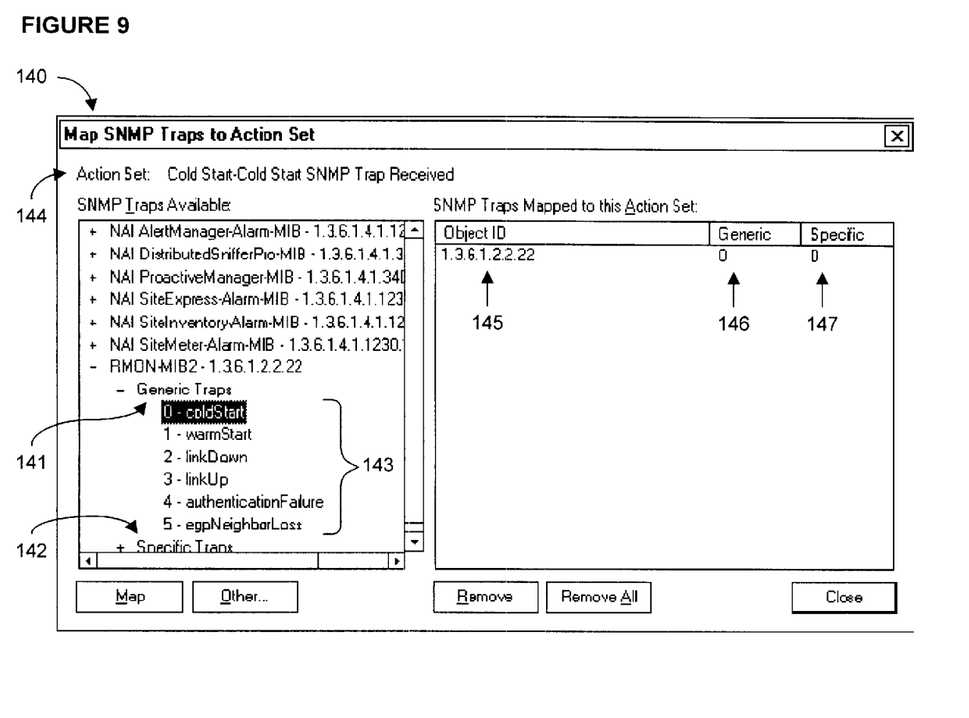
FIG. 9 is a screen shot showing, by way of example, the user controls for configuring an external event for use in the routine of FIG. 7.

In the described embodiment, a graphical user interface (GUI) allows a user to configure the external network events in any random order. By way of example, FIG. 6 is a screen shot 120 showing the user controls for configuring an action set 60 for use in the method 100 of FIGS. 5A and 5B. FIG. 9 is a screen shot 140 showing the user controls for configuring an external event for use in the routine 103 of FIG. 7. Two base forms of external network events are supported, certograms 30 and SNMP traps 31 (shown in FIG. 2), as described above. More specifically, the supported SNMP traps 31 are categorized into generic traps 141 and specific traps 142. The individual generic traps 143 are identified with codes ranging from '0' to '5' as follows: 0—cold start, 1—warm start, 2—link down, 3—link up, 4—authentication failure, and 5—neighbor loss. Each action set contains a mapping which identifies at least one external network event by object identifier (OID), plus Generic and Specific identifiers corresponding to the codes for the generic traps 141 and specific traps 142. As shown, the example action set 144 for "Cold Start—Cold Start SNMP Trap Received" is mapped to an external network event identified by an OID 147 of "1.3.6.1.2.2.22" which identifies the RMON-MIB2 at network address 1.3.6.1.2.2.22 with generic trap 146 '0' corresponding to a cold start and specific trap 147 '0' corresponding to no trap (which has no meaning if the Specific identifier is not set to '6'). Other external network events are feasible.

Figure 10:
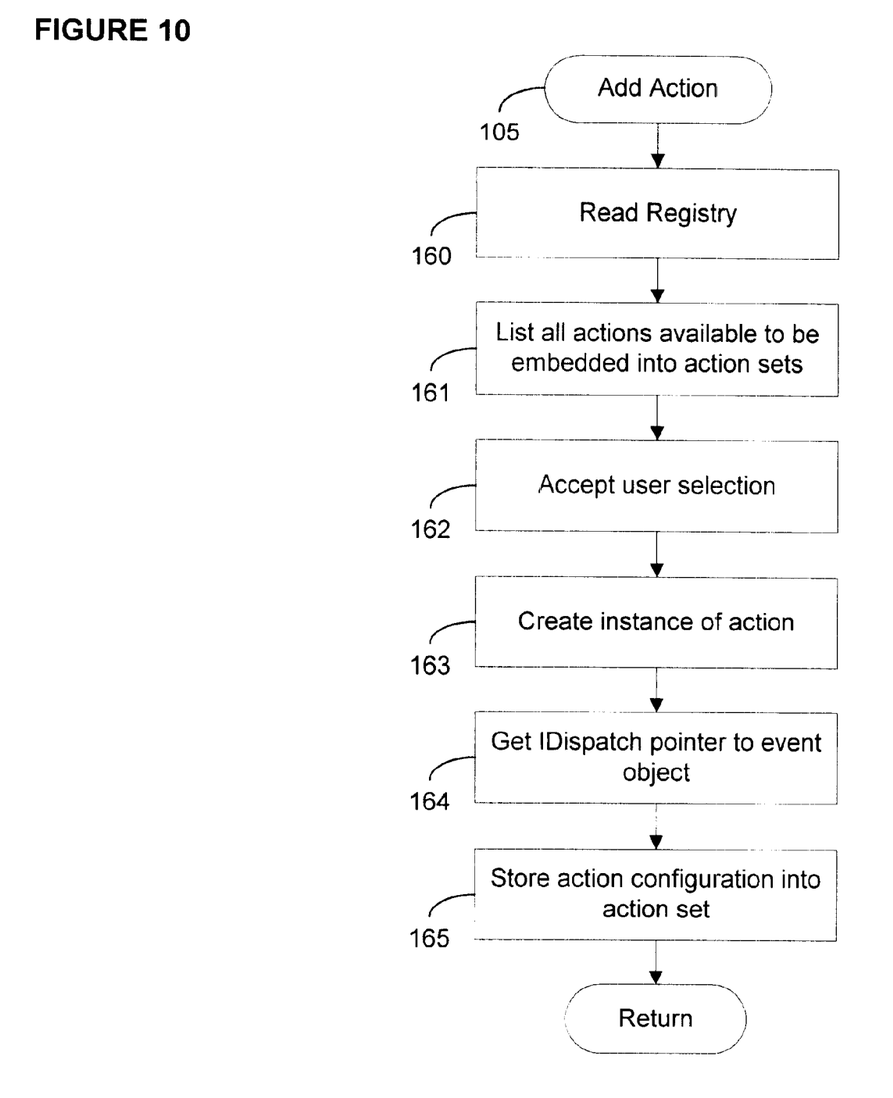
FIG. 10 is a block diagram showing the routine for adding an action for use in the routine of FIGS. 5A and 5B.

FIG. 10 is a block diagram showing the routine for adding an action 105 for use in the routine 100 of FIGS. 5A and 5B. The purpose of this routine is to embed an action into an action set 60. The system registry is read (block 160) by the action set viewer 53 (shown in FIG. 3) and all actions available to be embedded into action sets are listed (block 161). Upon the selection of an action by the user (block 162), an instance of the selected action is created (block 162). An IDispatch pointer to an event object is obtained (block 164. Finally, the action configuration is stored into the database record for the action set 60 (block 165), whereupon the routine returns.

Figure 11:
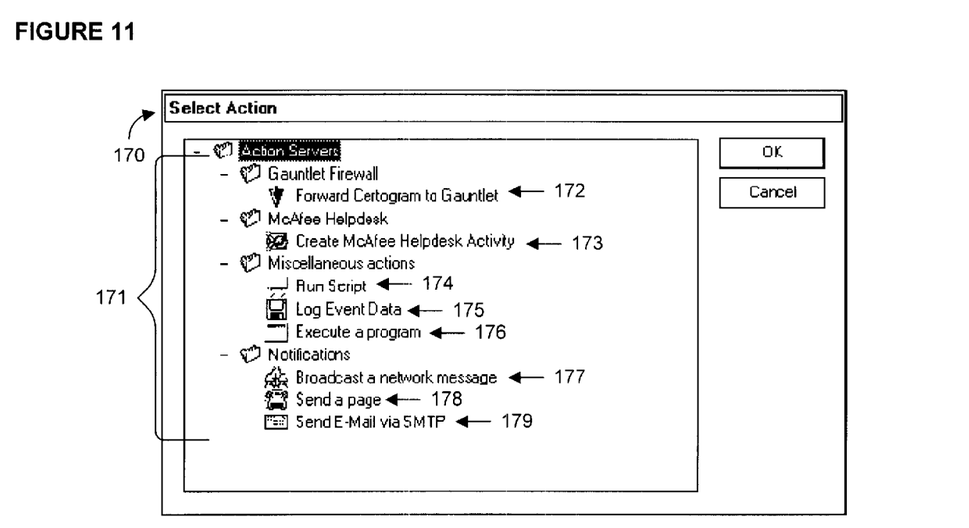
FIG. 11 is a screen shot showing, by way of example, the user controls for configuring an action for use in the routine of FIG. 10.

In the described embodiment, a graphical user interface (GUI) allows a user to configure the actions in any random order. By way of example, FIG. 11 is a screen shot 170 showing the user controls for configuring an action for use in the routine 100 of FIG. 10. A number of actions 171 are supported, as described above. More specifically, two of the supported actions are specifically defined to pass information through to an actor 9. These actions include forwarding a certogram 30 to "Gauntlet" 171, that is, to firewall 28 (shown in FIG. 1) and creating a McAfee Helpdesk Activity 173, that is, creating a ticket for helpdesk 27 (shown in FIG. 1). Three of the supported actions are miscellaneous in the sense that these actions represent user definable activities, running a script 174 and executing a program 176; or information logging, log event data 175. Finally, three of the supported actions provide notifications by way of broadcasting a network message 177, sending an alphanumeric page 178, or sending an electronic mail (email) via the Simple Mail Transport Protocol (SMTP) 179. Other actions are feasible.

Figure 12:
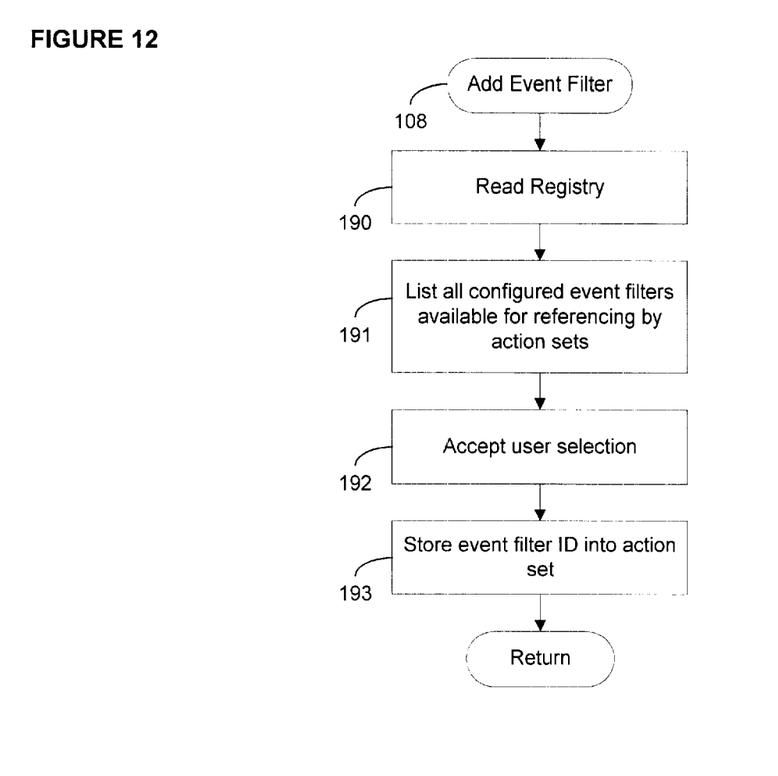
FIG. 12 is a block diagram showing the routine for adding an event filter for use in the routine of FIGS. 5A and 5B.

FIG. 12 is a block diagram showing the routine for adding an event filter 108 for use in the routine 105 of FIGS. 5A and 5B. The purpose of this routine is add a reference to an event filter into an action set 60. Event filters must be configured in a manner analogous to actions before being assigned to an action set. Configured filters are stored as BLOBs 60 in a global table (not shown). The system registry is read (block 190) by the action set viewer 53 (shown in FIG. 3) and all event filters available for referencing by action sets are listed (block 191). Upon the selection of an event filter by the user (block 192), the event filter identifier 69 is saved into the database record for the active set 60 (block 195), whereupon the routine returns.

Figure 13:
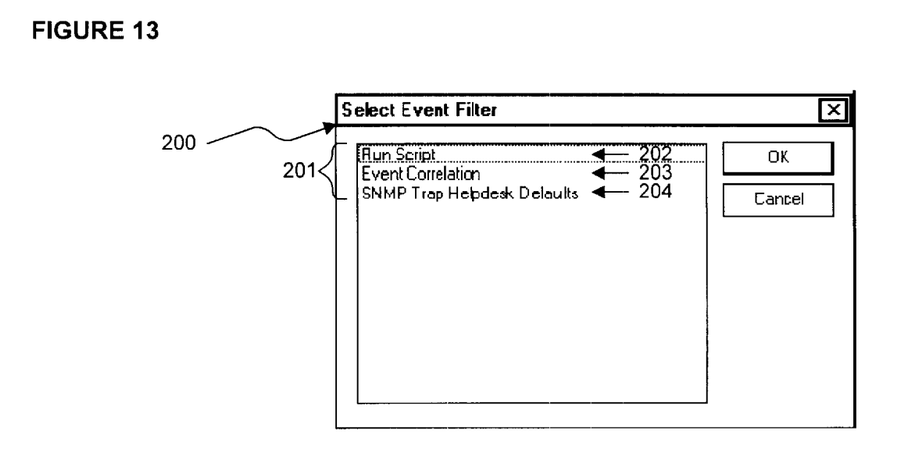
FIG. 13 is a screen shot showing, by way of example, the user controls for configuring an event filter for use in the routine of FIG. 12.

In the described embodiment, a graphical user interface (GUI) allows a user to configure the event filters in any random order. By way of example, FIG. 13 is a screen shot 200 showing the user controls for configuring an event filter for use in the routine 108 of FIG. 12. As described above, an event filter is applied upon the receipt of a specific external network event and before an associated action is executed. More specifically, three types of event filters 201 are supported. First, a user defined script can be run 202 which, in the described embodiment, is written as a VBScript, although any other scriptable programming language, such as JavaScript, is equally suitable. Second, a event correlation filter 203 can be specified. An event correlation filter prevents an action set 60 from being generated until a specified number of external network events are received within a specified time window. Finally, custom values can be added to a received SNMP trap before the trap is forwarded to the helpdesk 203. Other event filters are feasible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for configuring an action set for use in dynamically processing network events in a distributed computing environment, comprising:
   a graphical user interface associated with an action set;
   a database storing an action set;
   a manager console associating at least one network event and at least one sensor responsive to a user selection indicated on the graphical user interface and embedding at least one action into the action set responsive to a user selection indicated on the graphical user interface; and
   the database storing the association for the at least one network event and the embedding of the at least one action into a mapping table.

2. A system according to claim 1, further comprising:
   the manager console referencing at least one event filter into the action set responsive to a user selection indicated on the graphical user interface; and
   the database further storing the reference for the at least one event filter into the action set.

3. A system according to claim 2, wherein the event filter comprises at least one of running a script, setting an event correlation filter, and adding values to the network event.

4. A system according to claim 1, wherein the external event comprises at least one of an SNMP trap and a certogram.

5. A system according to claim 1, wherein the action comprises at least one of an forwarding an authenticated datagram to a firewall, creating a helpdesk activity ticket, running a script, logging event data, executing a program, broadcasting a network message, sending an alphanumeric page, and sending an electronic mail via SMTP.

6. A system according to claim 1, further comprising:
at least one agent sensing the occurrence of the network event; and
the at least one sensor receiving the network event occurrence message from the at least one agent.

7. A system according to claim 6, wherein the at least one agent is an authenticated agent, further comprising
a secure connection between the authenticated agent and the manager; and
the corresponding agent receiving the message over the secure connection upon authentication of the agent and the manager.

8. A system according to claim 7, wherein the secure connection is effected via a Transport Layer Security connection.

9. A system according to claim 1, further comprising:
a storage manager maintaining the action set mapping within a database.

10. A system according to claim 9, further comprising:
the storage manager further maintaining the action set as a binary large object (BLOB) within the database.

11. A method for configuring an action set for use in dynamically processing network events in a distributed computing environment, comprising:
presenting a graphical user interface associated with an action set;
storing an action set into a database;
associating at least one network event and at least one sensor responsive to a user selection indicated on the graphical user interface;
embedding at least one action into the action set responsive to a user selection indicated on the graphical user interface; and
storing the association for the at least one network event and the embedding of the at least one action into a mapping table.

12. A method according to claim 11, further comprising:
referencing at least one event filter into the action set responsive to a user selection indicated on the graphical user interface; and
storing the reference for the at least one event filter into the action set.

13. A method according to claim 12, wherein the event filter comprises at least one of running a script, setting an event correlation filter, and adding values to the network event.

14. A method according to claim 11, wherein the external event comprises at least one of an SNMP trap and a certogram.

15. A method according to claim 11, wherein the action comprises at least one of an forwarding an authenticated datagram to a firewall, creating a helpdesk activity ticket, running a script, logging event data, executing a program, broadcasting a network message, sending an alphanumeric page, and sending an electronic mail via SMTP.

16. A method according to claim 11, further comprising:
sensing the occurrence of the network event on at least one agent; and
receiving the network event occurrence message on the at least one sensor from the at least one agent.

17. A method according to claim 16, wherein the at least one agent is authenticated agent, further comprising
forming a secure connection between the authenticated agent and the manager; and
receiving the message over the secure connection upon authentication of agent and the manager.

18. A method according to claim 17, wherein the secure connection is effected via a Transport Layer Security connection.

19. A method according to claim 11, further comprising:
maintaining the action set mapping within a database.

20. A method according to claim 19, further comprising:
maintaining the action set as a binary large object (BLOB) within the database.

21. A computer-readable storage medium holding code for configuring an action set for use in dynamically processing network events in a distributed computing environment, comprising:
presenting a graphical user interface associated with an action set;
storing an action set into a database;
associating at least one network event and at least one sensor responsive to a user selection indicated on the graphical user interface;
embedding at least one action into the action set responsive to a user selection indicated on the graphical user interface; and
storing the association for the at least one network event and the embedding of the at least one action into a mapping table.

22. A storage medium according to claim 21, further comprising:
referencing at least one event filter into the action set responsive to a user selection indicated on the graphical user interface; and
storing the reference for the at least one event filter into the action set.

23. A storage medium according to claim 21, further comprising:
sensing the occurrence of the network event on at least one agent; and
receiving the network event occurrence message on the at least one sensor from the at least one agent.

24. A storage medium according to claim 23, wherein the at least one agent is an authenticated agent, further comprising
forming a secure connection between the authenticated agent and the manager; and
receiving the message over the secure connection upon authentication of the agent and the manager.

25. A storage medium according to claim 21, further comprising:
maintaining the action set mapping within a database.

26. A storage medium according to claim 25, further comprising:
maintaining the action set as a binary large object (BLOB) within the database.

* * * * *

UNITED STATES PATENT AND TRADEMARK OFFICE
CERTIFICATE OF CORRECTION

PATENT NO.    : 6,470,384 B1
DATED         : October 22, 2002
INVENTOR(S)   : O'Brien et al.

It is certified that error appears in the above-identified patent and that said Letters Patent is hereby corrected as shown below:

Column 12,
Line 4, "one agent is authenticated agent, further comprising:" should read
-- one agent is an authenticated agent, further comprising: --
Line 8, "authentication of agent and the manager." should read -- authentication of the agent and the manager. --

Signed and Sealed this

Twentieth Day of May, 2003

JAMES E. ROGAN
*Director of the United States Patent and Trademark Office*